United States Patent
Yoon et al.

(10) Patent No.: US 12,270,979 B2
(45) Date of Patent: Apr. 8, 2025

(54) DIGITAL HOLOGRAPHIC MICROSCOPE ROBUST TO EXTERNAL ENVIRONMENT

(71) Applicant: Korea Photonics Technology Institute, Gwangju (KR)

(72) Inventors: Seon Kyu Yoon, Gwangju (KR); Jin Su Lee, Gwangju (KR); Sung Kuk Chun, Gwangju (KR)

(73) Assignee: Korea Photonics Technology Institute, Gwangju (KR)

( * ) Notice: Subject to any disclaimer, the term of this patent is extended or adjusted under 35 U.S.C. 154(b) by 148 days.

(21) Appl. No.: 18/315,947

(22) Filed: May 11, 2023

(65) Prior Publication Data
US 2024/0168270 A1    May 23, 2024

(30) Foreign Application Priority Data
Nov. 22, 2022  (KR) .................. 10-2022-0157319

(51) Int. Cl.
| G02B 21/04 | (2006.01) |
| G02B 21/36 | (2006.01) |
| G03H 1/00  | (2006.01) |

(52) U.S. Cl.
CPC .......... *G02B 21/04* (2013.01); *G02B 21/365* (2013.01); *G03H 1/0005* (2013.01); *G03H 2001/005* (2013.01)

(58) Field of Classification Search
None
See application file for complete search history.

(56) References Cited

U.S. PATENT DOCUMENTS

| 5,644,413 A | 7/1997 | Komma | |
| 2013/0342673 A1* | 12/2013 | Sticker | G02B 21/245 348/79 |
| 2019/0307882 A1* | 10/2019 | Shemesh | A61K 38/17 |
| 2021/0063964 A1* | 3/2021 | Marshel | G03H 1/2294 |

FOREIGN PATENT DOCUMENTS

| JP | H6-103605 A | 4/1994 |
| KR | 10-2009-0073221 A | 7/2009 |

* cited by examiner

*Primary Examiner* — Mikhail Itskovich
(74) *Attorney, Agent, or Firm* — Dinsmore & Shohl LLP; Yongsok Choi, Esq.

(57) ABSTRACT

This disclosure relates to a digital holographic microscope which is robust to an external environment. According to an aspect of the present embodiment, there is provided an optical system for a digital holographic microscope, the optical system including a beam splitter which reflects a light radiated from a light source toward an object, or passes a light reflected from and traveling from the object; an objective lens focusing the light reflected by the beam splitter on the object; a transflective mirror which is located on the surface of the objective lens and is determined to be transparent or reflective depending on a polarization direction of a light incident to the transflective mirror; and a wave plate which converts the light passing through the beam splitter into a circularly polarized light.

12 Claims, 5 Drawing Sheets

DIGITAL HOLOGRAPHIC MICROSCOPE ROBUST TO EXTERNAL ENVIRONMENT

CROSS-REFERENCE TO RELATED APPLICATION

This application claims priority to Korean Patent Application No. 10-2022-0157319 filed on Nov. 22, 2022, the entire contents of which are herein incorporated by reference.

TECHNICAL FIELD

The present disclosure relates to a digital holographic microscope which is robust to an external environment.

BACKGROUND ART

The contents described in this section merely provide background information about the present embodiment, and do not constitute the prior art.

A general microscope usually measures the shape of an object by causing light from a general light source to be radiated to an object and measuring the intensity of light reflected from or passing through the object. A digital holographic microscope measures the interference phenomenon between the diffraction light and the reference light that occurs when light is radiated on an object, records it digitally, and restores the shape information of the object from such information.

In the case of a conventional optical holographic microscope, interference pattern information of light is recorded on a special film. The conventional optical holographic microscope radiates a reference light on the special film on which interference patterns have been recorded, restoring the virtual shape of the object to be measured in the place where the object to be measured was originally located.

Meanwhile, the digital holographic microscope generates light of a single wavelength, such as a laser, and splits it into two lights using a beam splitter, one light being radiated directly on an image sensor (referred to as reference light) and the other light being radiated on an object to be measured. When the light reflected from or passing through the object to be measured (referred to as object light) is radiated onto the image sensor, interference occurs between the reference light and the object light in the image sensor, and the digital holographic microscope records such interference pattern information of light with the digital image sensor. The digital holographic microscope restores the shape of the object to be measured based on the recorded interference pattern information by the use of a computer. In this regard, the recorded interference pattern information is generally referred to as a hologram.

Compared to the conventional optical holographic method, the digital holographic microscope differs from it in that the digital holographic microscope measures the interference pattern information of light with the digital image sensor and stores it digitally, and that the shape of the object to be measured is restored by processing the stored interference pattern information in a numerical calculation method using a computer device or the like rather than in an optical method.

The conventional digital holographic microscope is shown in FIGS. 4 and 5.

Referring to FIG. 4, a light source 410 radiates light, and a beam splitter 420 splits the light radiated by the light source 410 on the path of that light. Among the split lights, the light traveling to a reflective mirror 430 is reflected by the reflective mirror 430, and becomes the reference light. Among the split lights, the other light is radiated to an object 450 through an objective lens 440, is reflected from the object 450, and becomes the object light. The reference light and the object light, which are reflected from the reflective mirror 430 and the object 450, respectively, interfere with each other, and an image sensor 460 records the interference pattern, on which an analysis device 470 proceeds with an analysis.

Meanwhile, referring to FIG. 5, a polarization beam splitter 510 may be included in the conventional digital holographic microscope 500 instead of the beam splitter 420. The polarization beam splitter 510 splits the light radiated from the light source 410 based on the polarization directions of the light. As in the conventional digital holographic microscope 400, the split lights interfere with each other as the reference light and the object light. At this time, in order to induce the interference, a wave plate 520 is disposed between the polarization beam splitter 510 and the image sensor 460. The wave plate 520 converts linearly polarized beams, which have been reflected from the reflective mirror 430 and the object 450, respectively, and have traveled by way of the polarization beam splitter 510, into circularly polarized beams of different directions according to the polarization directions of the linearly polarized beams. The lights converted into the circularly polarized beams interfere with each other, which is recorded in the image sensor 460.

The interference between the reference light and the object light affects the phase as well as the intensity or amplitude of the light. In order to generate the reference light in the conventional digital holographic microscope 400 or 500, the light split by the (polarization) beam splitter 420 or 510 needs to travel to the reflective mirror 430, and the reflected light by the reflective mirror 430 needs to travel back to the (polarization) beam splitter 420 or 510.

In this regard, the reflective mirror 430 is disposed in an environment exposed to the outside. In particular, when the reflective mirror 430 is exposed to vibration, the reflective mirror 430 vibrates, which may result in changes to the phase of the reference light. The change in the phase of the reference light may change the phase of the interference light, problematically causing changes in the information about an object to be recorded, which may lead to the provision of inaccurate object information to an observer.

Additionally, in order to correct optical aberration which may occur due to the characteristics of the objective lens 440, the same lens as the objective lens 440 may be added between the beam splitter 510 and the reflective mirror 430. However, it is difficult even for lenses of the same type to completely correct the aberration due to the tolerances generated in the manufacturing process. Accordingly, a problem of deterioration in accuracy may occur, and inaccurate information about the object may be provided to the observer.

SUMMARY OF THE INVENTION

Technical Problem

An object of an embodiment of the present disclosure is to provide a digital holographic microscope which is robust to an external environment, in particular, an optical system aberration or a vibration.

Technical Solution

According to an aspect of the present disclosure, there is provided an optical system for a digital holographic microscope, the optical system including a beam splitter which reflects a light radiated from a light source toward an object, or passes a light reflected from and traveling from the object; an objective lens focusing the light reflected by the beam splitter on the object; a transflective mirror which is located on the surface of the objective lens and is determined to be transparent or reflective depending on a polarization direction of a light incident to the transflective mirror; and a wave plate which converts the light passing through the beam splitter into a circularly polarized light.

According to an embodiment of the present disclosure, the transflective mirror is disposed on the surface of the objective lens from which a light is radiated to the object.

According to an embodiment of the present disclosure, the light source radiates a light including both a vertical polarization component and a horizontal polarization component.

According to an embodiment of the present disclosure, the transflective mirror reflects one of the vertical polarization component and the horizontal polarization component, and passes the other one of the vertical polarization component and the horizontal polarization component.

According to an embodiment of the present disclosure, the wave plate converts one of the horizontal polarization component and the vertical polarization component into a left-hand circularly polarized light (LHCP), and the other one of the horizontal polarization component and the vertical polarization component into a right-hand circularly polarized light (RHCP).

According to another aspect of the present disclosure, there is provided an optical system for a digital holographic microscope, the optical system including a beam splitter which reflects a light radiated from a light source toward an object, or passes a light reflected from and traveling from the object; an objective lens focusing the light reflected by the beam splitter on the object; a transflective mirror located on the surface of the objective lens to reflect one of a vertical polarization component and a horizontal polarization component of a light incident to the transflective mirror as it is, and pass the other one of the vertical polarization component and the horizontal polarization component to the object so that the light passing through the transflective mirror can be reflected from the object; and a wave plate which converts the light passing through the beam splitter into a circularly polarized light.

According to an embodiment of the present disclosure, the transflective mirror is disposed on the surface of the objective lens from which a light is radiated to the object.

According to an embodiment of the present disclosure, the light source radiates a light including both a vertical polarization component and a horizontal polarization component.

According to an embodiment of the present disclosure, the transflective mirror reflects one of the vertical polarization component and the horizontal polarization component, and passes the other one of the vertical polarization component and the horizontal polarization component.

According to an embodiment of the present disclosure, the wave plate converts one of the horizontal polarization component and the vertical polarization component into a left-hand circularly polarized light (LHCP), and the other one of the horizontal polarization component and the vertical polarization component into a right-hand circularly polarized light (RHCP).

According to still another aspect of the present disclosure, there is provided a digital holographic microscope including a light source; an optical system which splits the light radiated from the light source, and causes both of the split lights to interfere with each other; an image sensor which senses interference information or diffraction information when the light formed by the interference in the optical system is incident on the image sensor; and an image processor which obtains three-dimensional information of the object based on the information sensed by the image sensor, wherein the optical system includes a beam splitter which reflects a light radiated from a light source toward an object, or passes a light reflected from and traveling from the object; an objective lens focusing the light reflected by the beam splitter on the object; a transflective mirror which is located on the surface of the objective lens and is determined to be transparent or reflective depending on a polarization direction of a light incident to the transflective mirror; and a wave plate which converts the light passing through the beam splitter into a circularly polarized light.

According to an embodiment of the present disclosure, the image sensor includes a charge coupled device (CCD) camera.

According to yet still another aspect of the present disclosure, there is provided a digital holographic microscope including a light source; an optical system which splits the light radiated from the light source, and causes both of the split lights to interfere with each other; an image sensor which senses interference information or diffraction information when the light formed by the interference in the optical system is incident on the image sensor; and an image processor which obtains three-dimensional information of the object based on the information sensed by the image sensor, wherein the optical system includes a beam splitter which reflects a light radiated from a light source toward an object, or passes a light reflected from and traveling from the object; an objective lens focusing the light reflected by the beam splitter on the object; a transflective mirror located on the surface of the objective lens to reflect one of a vertical polarization component and a horizontal polarization component of a light incident to the transflective mirror as it is, and pass the other one of the vertical polarization component and the horizontal polarization component to the object so that the light passing through the transflective mirror can be reflected from the object; and a wave plate which converts the light passing through the beam splitter into a circularly polarized light.

According to an embodiment of the present disclosure, the interference information includes the intensity or amplitude, and the phase of light.

Advantageous Effects

As described above, an embodiment of the present disclosure can provide an advantage of being able to be robust to an optical path difference caused by the tolerance of an objective lens, and an external environment, in particular a vibration, when measuring characteristics of an object.

DETAILED DESCRIPTION

Figure 1:
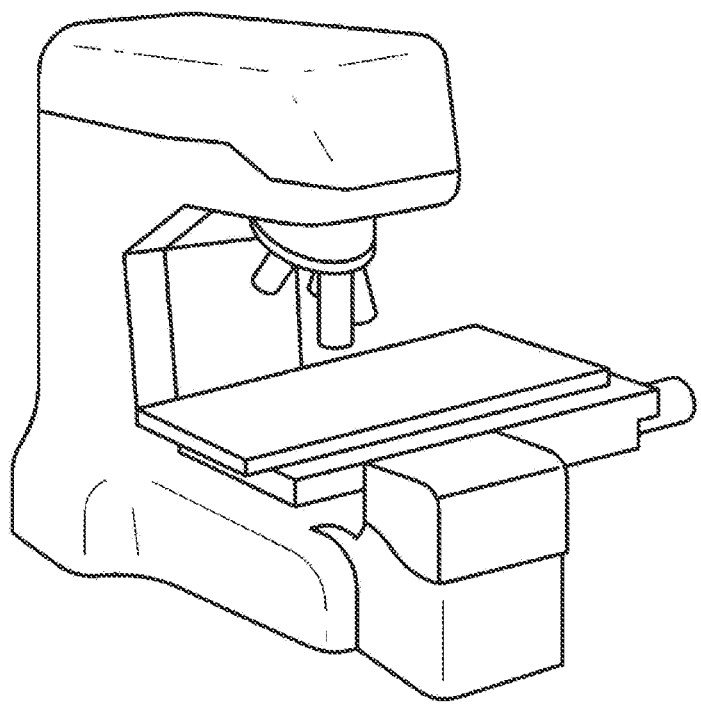
FIG. 1 is a diagram showing a digital holographic microscope according to an embodiment of the present disclosure.

Although the present disclosure may be modified in various forms, specific embodiments thereof will be described in detail and illustrated in the drawings. However, this is not intended to limit the present embodiment to a specific form of disclosure, and it should be understood that all changes, equivalents, and substitutes are included in the technical idea and scope of the present disclosure. At the time of describing respective drawings, like reference numerals have been used for like components.

Terms, such as "first", "second," A, and B, can be used to describe various components, but the components should not be limited by the terms. Said terms are used in order only to distinguish one component from another component. For example, the first component can be designated as the second component without departing from the scope of the present disclosure, and, similarly, the second component can also be designated as the first component. The term "and/or" includes a combination of a plurality of related listed items or any of the plurality of related listed items.

Further, when one component is referred to as being "connected to" or "coupled to" another element, this can be understood as that the one component is directly connected or coupled to that other component, or any intervening component is also present therebetween. Contrarily, when one component is referred to as being "directly connected to" or "directly coupled to" to another component, it should be understood as that no other element is present therebetween.

The terms used in this application are used to merely describe specific embodiments, but are not intended to limit the disclosure. Singular expressions may include the meaning of plural expressions unless the context clearly indicates otherwise. As used in this application, it should be understood that the terms "comprise", "have", and the like do not preclude the possibility of the presence or addition of features, numbers, steps, actions, components, parts stated in the specification, or combinations thereof.

Unless otherwise defined, all terms used herein, including technical or scientific terms, have the same meaning as commonly understood by a person of ordinary skill in the art to which the present disclosure pertains.

Terms as defined in a commonly used dictionary should be interpreted as having a meaning consistent with the meaning in the context of the related technology, and are not to be interpreted as an ideal or excessively formal meaning unless explicitly defined in this application.

Additionally, each configuration, process, procedure, method, or the like included in each embodiment of the present disclosure may be combined with each other unless a mutual contradiction arises in a technical context.

FIG. 1 is a diagram showing a digital holographic microscope according to an embodiment of the present disclosure.

The digital holographic microscope 100 measures the shape of an object by analyzing light reflected from or passing through the object (hereinafter, referred to as 'object light') and hologram information obtained by using an interference phenomenon. The digital holographic microscope 100 radiates light, and splits the radiated light into one part for an object light, and another part for the light traveling along a separate light path (hereinafter, referred to as 'reference light') to induce interference with the object light. The digital holographic microscope 100 receives interference light of both lights with an image sensor to sense interference information and diffraction information of the interference light. The digital holographic microscope 100 obtains three-dimensional information, such as the shape of the object, based on the sensed informations.

Figure 2:
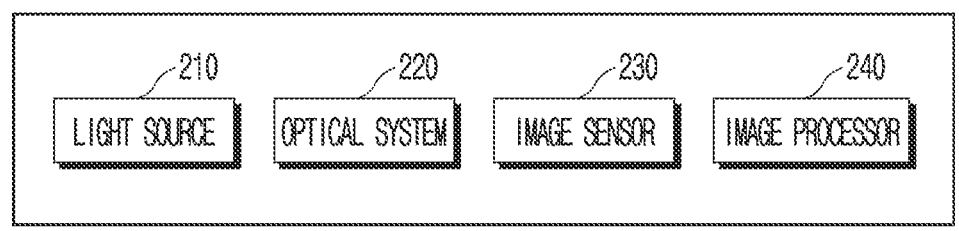
FIG. 2 is a diagram showing the configuration of the digital holographic microscope according to an embodiment of the present disclosure.

FIG. 2 is a diagram showing the configuration of the digital holographic microscope according to an embodiment of the present disclosure.

Referring to FIG. 2, the holographic microscope 100 according to an embodiment of the present disclosure includes a light source 210, an optical system 220, an image sensor 230, and an image processor 240.

The light source 210 radiates light to the optical system 220. The light radiated from the light source 210 to the optical system 220 can be formed into an object light, a reference light, and an interference light by the optical system 220.

The light radiated from the light source 210 has both a vertical polarization component and a horizontal polarization component. As will be described later, the optical system 220 forms the object light and the reference light depending on the polarization components. Accordingly, the light source 210 outputs the light having both the vertical polarization component and the horizontal polarization component, so that the both lights can be formed.

The optical system 220 splits the light radiated from the light source 210 into the object light and the reference light, and causes both of the split lights to interfere with each other. The optical system 220 causes a part of the light radiated from the light source 210 to be split therefrom in a direction where the object is located, so that the part of the light is reflected from the object or passes through the object to become the object light. The optical system 220 causes another part of the light radiated from the light source 210 to be split therefrom toward a reflective mirror, so that said another part of the light becomes the reference light. The optical system 220 causes the split lights to travel along respective optical paths, and to finally travel along one path. The split lights traveling along the one path interfere with each other. As the object light and the reference light interfere with each other, the interference light includes interference information caused by the object. The interference information is information making known three-dimensional information such as the shape of an object, and includes the intensity, amplitude, phase, and the like of the interference light. The optical system 220 allows the reference light to be incident to the image sensor 230.

The image sensor 230 receives the interference light, and senses the interference information or the diffraction information. The image sensor 230 may be implemented as a charge coupled device (CCDD) camera, sensor, or the like capable of sensing the interference information, for example, the intensity, amplitude, and phase of light, or may be implemented as a plenoptic camera or sensor capable of sensing the diffraction information.

The image processor 240 obtains three-dimensional information of the object based on the information sensed by the image sensor 230. The image processor 240 may obtain three-dimensional information of the object from the diffraction information or the interference information from the image sensor 230.

Figure 3A:
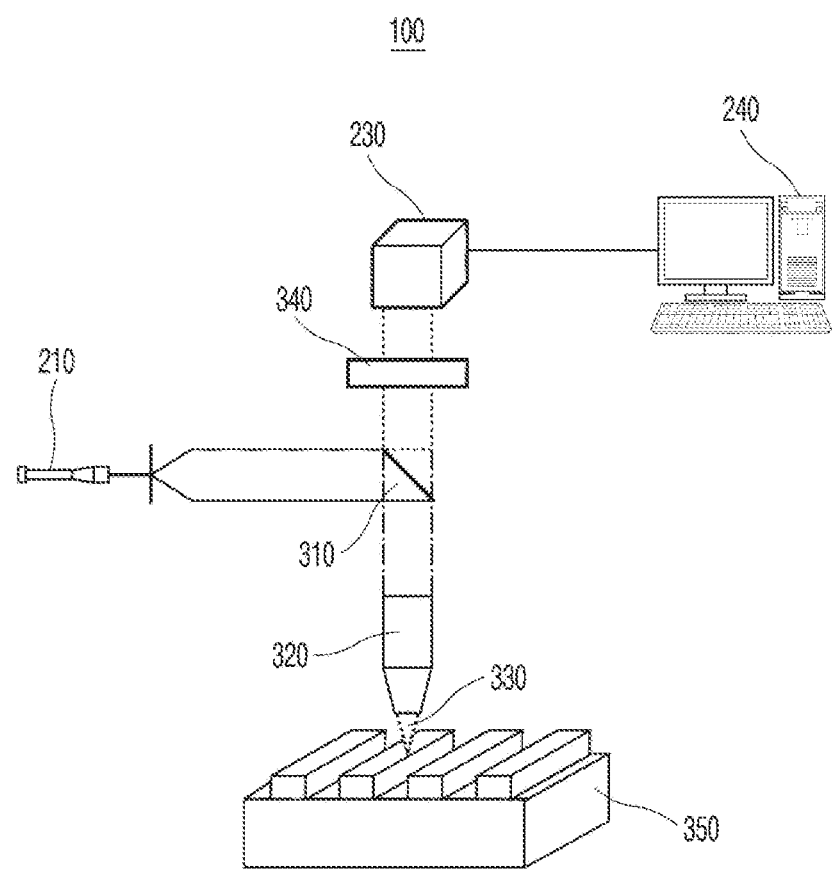
FIGS. 3A and 3B are diagrams showing the configuration of the optical system according to an embodiment of the present disclosure.
Figure 3B:
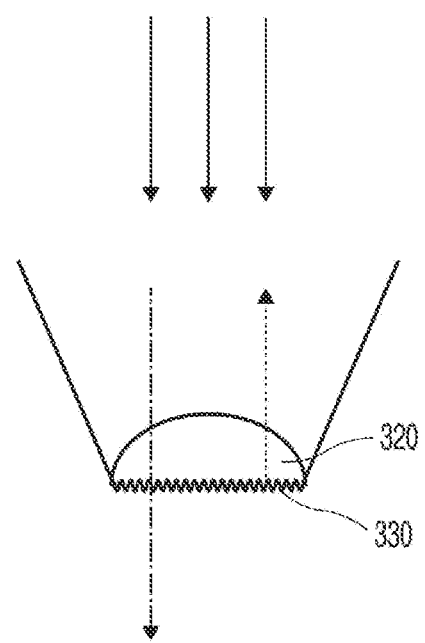
Figure 4:
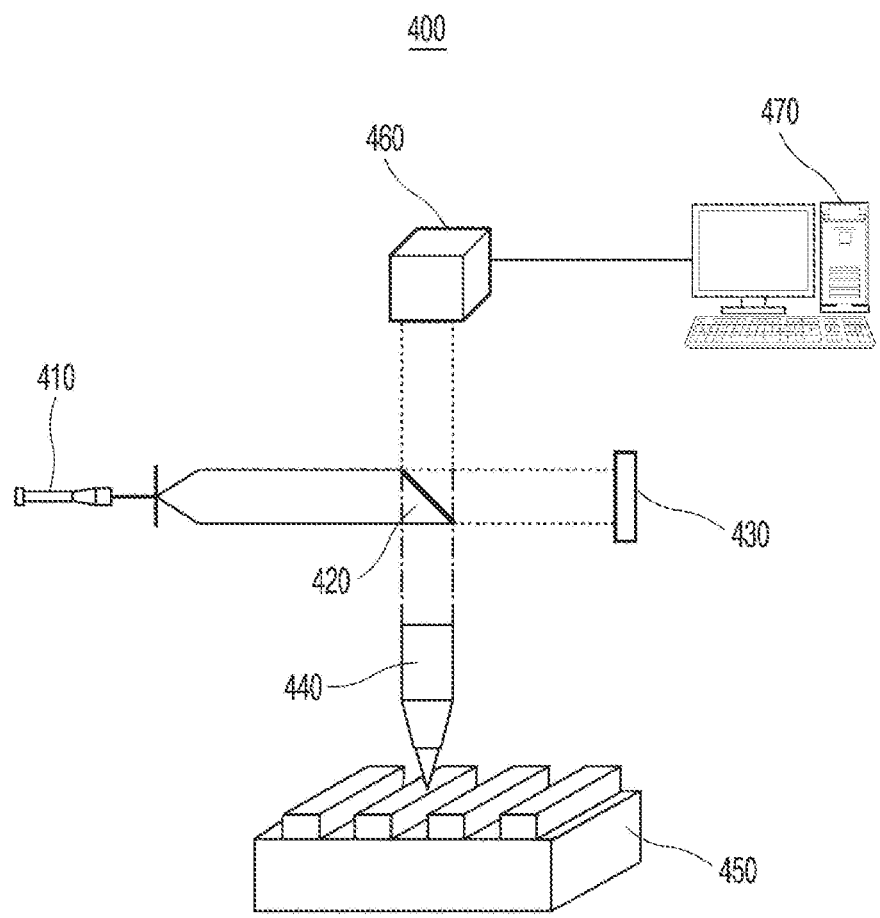
FIGS. 4 and 5 are diagrams showing the configurations of conventional digital holographic microscopes.
Figure 5:
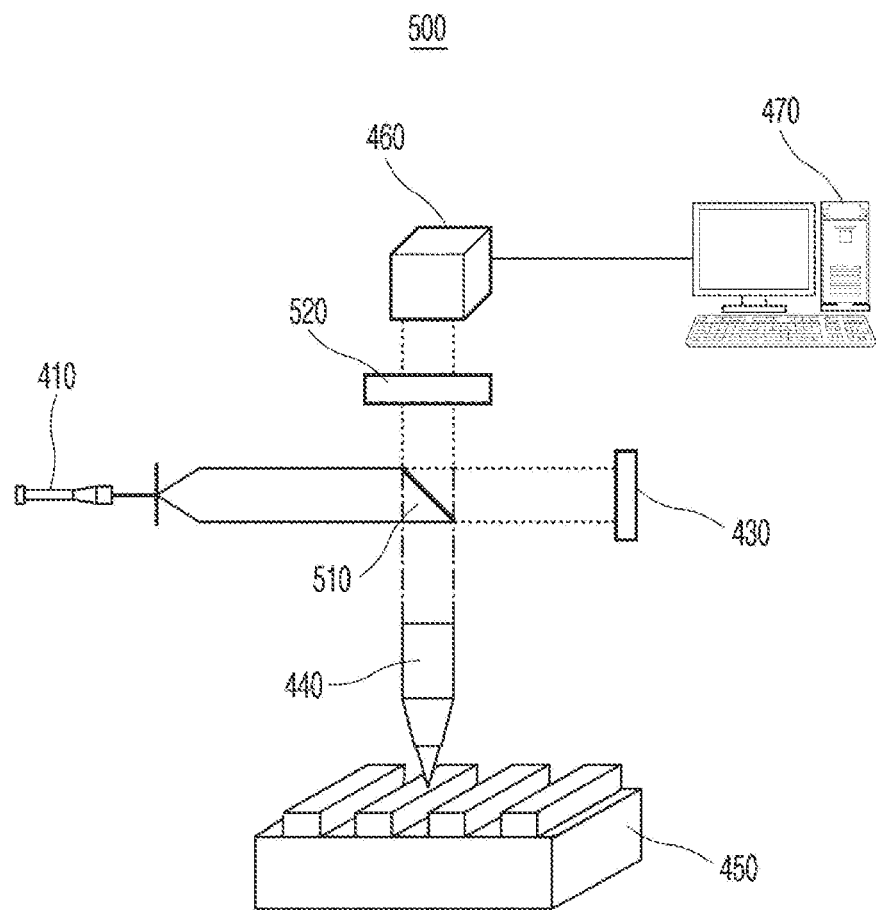

FIGS. 3A and 3B are diagrams showing the configuration of the optical system according to an embodiment of the present disclosure.

Referring to FIG. 3, the optical system 220 according to an embodiment of the present disclosure includes a beam splitter 310, an objective lens 320, a transflective mirror 330, and a wave plate 340.

The beam splitter 310 reflects, toward the object 350, the light radiated from the light source 210 and incident thereto, and passes the light reflected from the object 350 or the transflective mirror 330. The beam splitter 310 reflects, toward the object 350, all the light radiated from the light source 210 and incident thereto. Meanwhile, the beam splitter 310 passes the light reflected from the object 350 or the transflective mirror 330, so that the light passing through the beam splitter can be incident to the image sensor 230.

The objective lens 320 focuses the light reflected from the beam splitter 310 on the object 350.

The transflective mirror 330 is disposed on the surface of the objective lens 320, and is determined to be transparent or reflective based on the polarization direction of the light incident to the transflective mirror 330. The transflective mirror 330 is determined to be transparent or not based on the polarization direction. For example, when the transflective mirror 330 passes the vertical polarization component, it reflects the horizontal polarization component. As the transflective mirror 330 operating in this way is disposed on the surface of the objective lens 320, the light reflected from the beam splitter 310 travels as shown in FIG. 3B.

Referring to FIG. 3B, the transflective mirror 330 is disposed at the end (surface) of the objective lens 320 from which light is outputted. Among the light incident to the objective lens 320, light of one polarization direction is reflected from the transflective mirror 330, while light of the other polarization direction passes through the transflective mirror 330. Since the light reflected from the transflective mirror 330 cannot travel to the object 350, it serves as the reference light. Meanwhile, the light passing through the transflective mirror 330 is reflected from the object 350, and serves as the object light. Since the light source 210 outputs light including light of both polarization components, both the reference light and the object light can be generated. The reference light reflected from the transflective mirror 330 travels, as it is, toward the objective lens 320 and the beam splitter, and the object light passing through the transflective mirror 330 travels to the object 350, is reflected from the object 350, and then travels toward the objective lens 320 and the beam splitter.

The transflective mirror 330 may be implemented as, but is not limited to, a wire grid polarizer (WGP), and may be replaced with any configuration that partially passes or partially reflects light depending on the polarization direction of the light.

The wave plate 340 converts the reference light and the object light, which are incident thereto by way of the beam splitter 310, into circularly polarized lights. The reference light and the object light correspond to horizontally polarized and vertically polarized linearly polarized beams, respectively. The wave plate 340 converts both the lights into different circularly polarized light beams according to the polarization directions of both the lights. The wave plate 340 converts one of the horizontally polarized light and the vertically polarized light into a left-hand circularly polarized light (LHCP), and the other one of the horizontally polarized light and the vertically polarized light into a right-hand circularly polarized light (RHCP). The reference light and the object light passing through the wave plate 340 interfere with each other, and the interference light is incident to the image sensor 230.

As the optical system 220 has such configuration, the following effects can be obtained. There is no need for the split light to travel to the separate reflective mirror to form the reference light as described in the conventional related art. Since there is no need to install the reflective mirror, it is possible to prevent a component such as the reflective mirror from being exposed to the external environment. Accordingly, it is possible to prevent a change in optical characteristics caused by an external environment, in particular, vibration, that affects the intensity or amplitude, and phase of light, thereby preventing the measurement result of the object from being changed.

The above description is merely illustrative of the technical idea of the present embodiment, and various modifications and changes can be made by those of ordinary skill in the art to which the present embodiment pertains, without departing from the essential characteristics of the present embodiment. Accordingly, the embodiments are not for limiting, but for explaining the technical spirit of the present embodiment, and the scope of the technical idea of the present embodiment is not limited by these embodiments. The protection scope of the present embodiment should be construed based on the following claims, and all technical ideas within the scope equivalent thereto should be construed as being included in the scope of the present embodiment.

REFERENCE SIGN LIST

100: Digital holographic microscope
210: Light source
220: Optical system
230, 460: Image sensor
240, 470: Image processor
310, 420: Beam splitter
320, 440: Objective lens
330: Transflective mirror
340, 520: Wave plate
430: Reflective mirror
350, 450: Object
510: Polarization beam splitter

The invention claimed is:

1. An optical system for a digital holographic microscope, the optical system comprising:
   a beam splitter which reflects a light radiated from a light source toward an object, or passes a light reflected from and traveling from the object;
   an objective lens focusing the light reflected by the beam splitter on the object;
   a transflective mirror which is located on a surface of the objective lens and is determined to be transparent or reflective depending on a polarization direction of a light incident to the transflective mirror; and
   a wave plate which converts the light passing through the beam splitter into a circularly polarized light.

2. The optical system of claim 1, wherein the transflective mirror is disposed on the surface of the objective lens from which a light is radiated to the object.

3. The optical system of claim 1, wherein the light source radiates a light including both a vertical polarization component and a horizontal polarization component.

4. The optical system of claim 3, wherein the transflective mirror reflects one of the vertical polarization component and the horizontal polarization component, and passes the other one of the vertical polarization component and the horizontal polarization component.

5. The optical system of claim 3, wherein the wave plate converts one of the horizontal polarization component and the vertical polarization component into a left-hand circularly polarized light (LHCP), and the other one of the horizontal polarization component and the vertical polarization component into a right-hand circularly polarized light (RHCP).

6. An optical system for a digital holographic microscope, the optical system comprising:
- a beam splitter which reflects a light radiated from a light source toward an object, or passes a light reflected from and traveling from the object;
- an objective lens focusing the light reflected by the beam splitter on the object;
- a transflective mirror located on a surface of the objective lens to reflect one of a vertical polarization component and a horizontal polarization component of a light incident to the transflective mirror as it is, and pass the other one of the vertical polarization component and the horizontal polarization component to the object so that the light passing through the transflective mirror can be reflected from the object; and
- a wave plate which converts the light passing through the beam splitter into a circularly polarized light.

7. The optical system of claim 6, wherein the transflective mirror is disposed on the surface of the objective lens from which a light is radiated to the object.

8. The optical system of claim 6, wherein the light source radiates a light including both a vertical polarization component and a horizontal polarization component.

9. The optical system of claim 8, wherein the transflective mirror reflects one of the vertical polarization component and the horizontal polarization component, and passes the other one of the vertical polarization component and the horizontal polarization component.

10. The optical system of claim 8, wherein the wave plate converts one of the horizontal polarization component and the vertical polarization component into a left-hand circularly polarized light (LHCP), and the other one of the horizontal polarization component and the vertical polarization component into a right-hand circularly polarized light (RHCP).

11. A digital holographic microscope comprising:
- a light source;
- an optical system which splits the light radiated from the light source, and causes both of the split lights to interfere with each other;
- an image sensor which senses interference information or diffraction information when the light formed by the interference in the optical system is incident on the image sensor; and
- an image processor which obtains three-dimensional information of an object based on the information sensed by the image sensor,
wherein the optical system includes:
  - a beam splitter which reflects a light radiated from a light source toward an object, or passes a light reflected from and traveling from the object;
  - an objective lens focusing the light reflected by the beam splitter on the object;
  - a transflective mirror which is located on a surface of the objective lens and is determined to be transparent or reflective depending on a polarization direction of a light incident to the transflective mirror; and
  - a wave plate which converts the light passing through the beam splitter into a circularly polarized light.

12. The digital holographic microscope of claim 11, wherein the image sensor includes a charge coupled device (CCD) camera.

* * * * *